No. 799,517. PATENTED SEPT. 12, 1905.
W. L. BLISS.
TRAIN LIGHTING SYSTEM.
APPLICATION FILED JAN. 30, 1905.
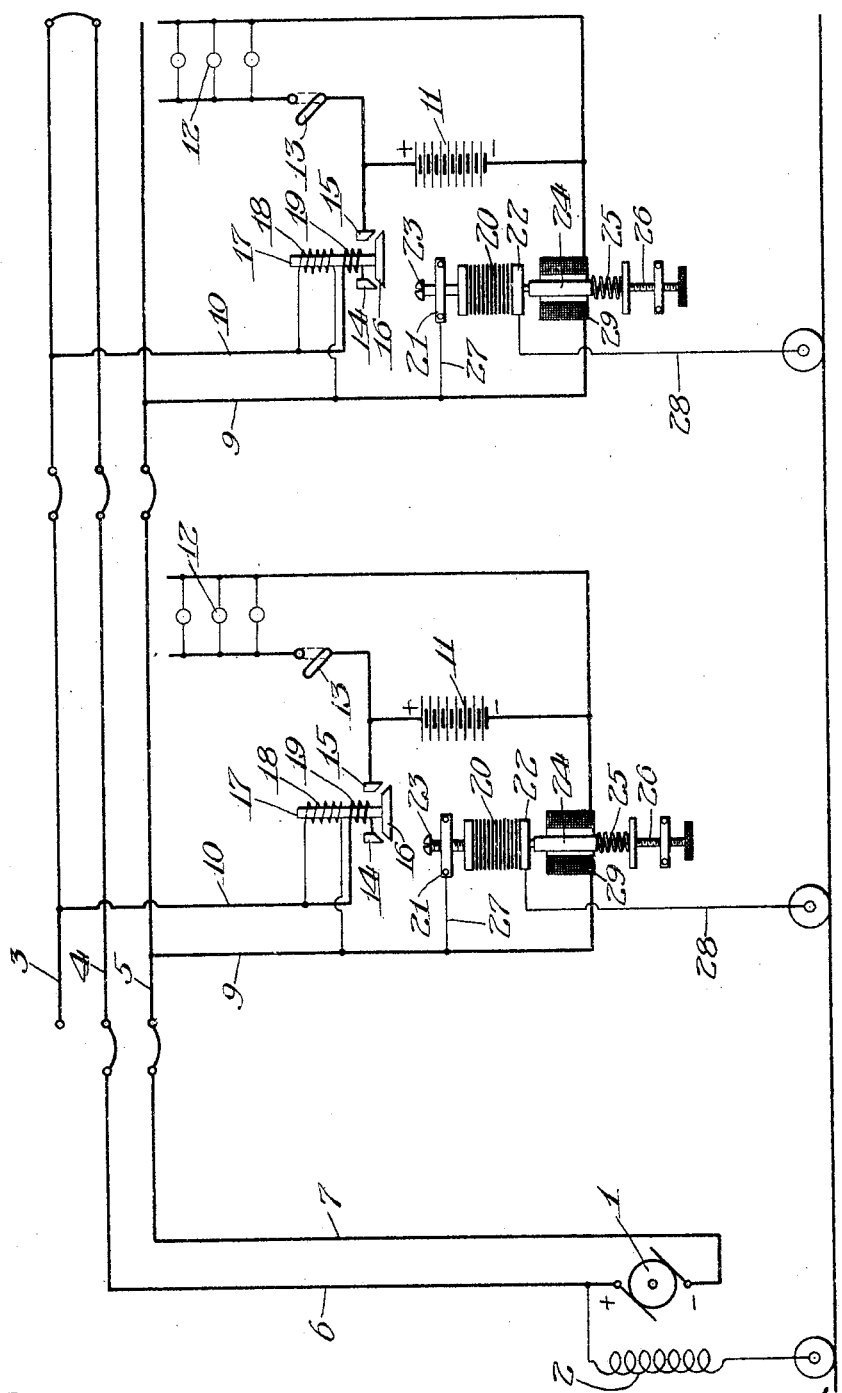
Witnesses:
Robert H. Weir
Edwin B. H. Tower, Jr
Inventor
William L. Bliss
By: Jones & Addington
Attorneys

UNITED STATES PATENT OFFICE.

WILLIAM L. BLISS, OF BROOKLYN, NEW YORK, ASSIGNOR TO BLISS ELECTRIC CAR LIGHTING COMPANY, OF MILWAUKEE, WISCONSIN, A CORPORATION OF WISCONSIN.

TRAIN-LIGHTING SYSTEM.

No. 799,517.      Specification of Letters Patent.      Patented Sept. 12, 1905.

Application filed January 30, 1905. Serial No. 243,374.

*To all whom it may concern:*

Be it known that I, WILLIAM L. BLISS, a citizen of the United States, residing at Brooklyn, in the county of Kings and State of New York, have invented new and useful Improvements in Train-Lighting Systems, of which the following is a full, clear, concise, and exact description, reference being had to the accompanying drawing, forming a part of this specification.

The present invention relates to improvements in lighting systems which are especially adapted to be employed for lighting cars or other units of transportation by electricity.

The particular form of system to which the present invention especially relates is adapted to be employed for lighting a train of cars. It is provided with a generator, which is driven by an axle or other means. It is also provided with storage batteries and translating devices, a storage battery and translating devices being arranged upon each car in the train. The storage batteries and translating devices are arranged in a main circuit, which is connected to the generator. The generator is regulated by means of an automatic regulator to confine the output thereof within safe limits, notwithstanding the wide variations in speed to which it is subjected upon variations in the speed of the train. The regulator is provided with an electromagnet which controls the operation thereof, said electromagnet being arranged in circuit where it will be subjected to variations in electrical conditions upon variations in the speed of the generator. When the number of cars in the train is changed, thereby changing the number of storage batteries and translating devices in the system, the demands for current will be changed—that is, the current which is necessary to operate the lamps and charge the storage batteries will be increased whenever cars are added to the train, and it will be decreased whenever cars are taken from the train. It is therefore necessary for the generator to vary the output thereof whenever the number of cars in the train is changed, so that the current which is available from the generator will be suitable for operating the system. If the electromagnet which controls the operation of the regulator be arranged in the main circuit in series with the storage batteries and the translating devices, it will be subjected to variations in current whenever the output of the generator varies, and in consequence the regulator will interfere with the generator varying the output thereof when the number of cars in the train is changed. Moreover, if said electromagnet be arranged across said main circuit in parallel with the storage batteries and the translating devices to permit the generator to vary the output thereof whenever the number of cars in the train is changed it will be subjected to such slight variations in current upon variations in the speed of the generator that it will be unable to effectually control the operation of the regulator.

The present invention has for an object thereof to provide a train-lighting system wherein the output of the generator may vary whenever the number of cars in the train is changed.

It has for another object to provide a train-lighting system wherein the controlling electromagnet of the regulator will be subjected to such variations in current upon variations in the speed of the generator that the generator will be effectively regulated under all circumstances.

The present application sets forth and claims a modification of an invention which is set forth in an application filed April 27, 1904, Serial No. 205,062.

According to the preferred form of the present invention, a rheostatic device or variable resistance is employed to regulate the generator. It is preferable to provide each car in the train with a rheostatic device which is adapted to confine the output of the generator within safe limits; but so far as the generic features of the invention are concerned it will be sufficient to employ a single rheostatic device to regulate the generator. The rheostatic device or variable resistance may be of different forms, and the electromagnet which controls the operation thereof may be arranged in circuit in various ways.

The accompanying drawing illustrates a system which will be explained for the purpose of disclosing the present invention.

The generator having an armature 1 and a field 2 is preferably arranged upon the tender of the locomotive; but it may be arranged upon any other unit of the train. The armature is preferably geared to an axle, and the field is preferably arranged in circuit in shunt with the armature. The generator is preferably regulated by means of a rheostatic device or variable resistance which is adapted to vary the strength of the field 2 as the speed of the armature 1 varies, thereby causing the voltage developed by the generator to be confined within such limits as are safe for the system. The cars or units of the train may each be provided with a rheostatic device or variable resistance which may regulate the generator. The several rheostatic devices are preferably arranged in circuit and parallel with each other, the same being collectively in series with the field of the generator. The train is preferably provided with a train-line or main circuit which extends through the cars or units thereof, said train-line preferably being provided with conductors 3, 4, and 5. The conductors 4 and 5 are connected to the generator at the forward end of the train by conductors or supply-mains 6 and 7, and the conductors 3 and 4 are preferably connected to each other at the rear end of the train by a conductor or jumper 8.

The equipment which is installed upon each car will now be explained. The drawing illustrates the equipment for two cars. As both equipments are alike, it will be sufficient in setting forth the same to refer to a single car. The car is provided with a local circuit, which consists of local mains or conductors 9 and 10, said local main being connected to the conductors 3 and 4, respectively, of the train-line. The several local circuits in the system are arranged in parallel across the train-line. As the length of the circuit between the generator and each local circuit is the same, the generator will impress the same voltage upon each local circuit. The car is also provided with a storage battery 11 and lamps or other translating devices 12, which are preferably connected to the local circuit in parallel. The circuit of the lamps is preferably controlled by a switch 13. The local circuit is preferably controlled by an automatic switch, which may be provided with stationary contacts 14 and 15 and a movable contact 16, said movable contact being adapted to engage said stationary contacts to close the local circuit. The movable contact is preferably carried by a plunger 17, which is actuated by windings 18 and 19 to operate the switch. The winding 18 is preferably arranged across the local circuit between the switch-contacts and the train-line, and the winding 19 is preferably arranged in series with the switch-contacts and the storage battery. The shunt-winding 18 will cause the switch to close whenever the voltage of the generator becomes equal to that of the storage battery. While the automatic switch remains closed the series winding will be energized by current flowing through the local circuit. So long as the generator sends current through the local circuit the series winding will assist the shunt-winding in keeping the movable contact firmly in engagement with the stationary contacts. Whenever the voltage of the generator falls below that of the storage battery, the storage battery will send current backward through the local circuit. The series winding will then oppose the shunt-winding, as the polarity thereof will be reversed, and in consequence it will cause the switch to open.

The rheostatic device or variable resistance which is employed to regulate the generator is preferably provided with a series of resistance-plates 20, of carbon or other suitable material. The resistance-plates are placed in contact with each other, the same preferably being arranged between a stationary terminal block 21 and a movable terminal block 22. The stationary terminal block is preferably engaged by a screw 23, by which the position thereof may be adjusted. The movable terminal block is preferably mounted upon a plunger 24, which bears upon a spring 25, said plunger being pressed upwardly by the spring to cause the resistance-plates to be pressed together. The spring is preferably mounted upon a screw 26, which is employed to adjust the tension thereof. The terminal block 21 is preferably connected to the local main 9 by a conductor 27, and the terminal block 22 is preferably connected to the field 2 of the generator by a conductor 28. The wheels of the car and the track upon which said wheels bear or the metal framework of the cars may form a part of the conductor 28. The plunger 24 is actuated by a controlling-electromagnet 29 to regulate the pressure between the resistance-plates. The controlling-electromagnet may be arranged in the local circuit in series with the storage battery and translating devices. It will be understood that the controlling-electromagnet may be arranged in circuit in other ways to accomplish the ends of the present invention. The pressure between the resistance-plates will be decreased whenever the strength of the controlling-electromagnet increases, and it will be increased whenever the strength of the controlling-electromagnet decreases. Whenever the pressure between the resistance-plates decreases, the resistance in the field-circuit will be increased, thereby reducing the strength of the field, and whenever it increases the resistance in the field-circuit will decrease, thereby causing the strength of the field to increase.

When the generator is in operation, it will deliver current through the train-line to the local circuit. If the voltage of the generator be substantially equal to that of the storage battery, the current for operating the lamps will be furnished by the generator and the storage battery; but if it be greater than that of the storage battery the entire current for operating the lamps will be furnished by the generator, and then the storage battery will receive current to charge the same. Inasmuch as the current delivered to the storage battery will depend upon the voltage developed by the generator, it will vary whenever the speed of the generator varies. The current delivered to the storage battery will increase in almost direct proportion to the rise in voltage of the generator above the normal voltage of the storage battery, thereby causing the controlling-electromagnet to be subjected to considerable variation in current upon slight variation in the speed of the generator. The generator may send current from the positive terminal thereof, through supply-main 6, conductors 4, 8, and 3, to local main 10. After the current traverses the local circuit it will flow from the local main 9, through conductor 5 and supply-main 7, to the negative terminal of the generator. The current may flow in the local circuit from the local main 10, through the switch 13, lamps 12, and controlling-electromagnet 29, to the local main 9. If the voltage thereof be sufficient, it may also flow from local main 10, through the storage battery 11, and controlling-electromagnet 29, to the local main 9. The current energizing the field 2 may flow from the positive terminal of the generator, through supply-main 6, field 2, conductor 28, resistance-plates 20, conductor 27, local main 9, conductor 5, and supply-main 7, to the negative terminal thereof. When the speed of the armature increases, the current flowing through the controlling-electromagnet will increase, thereby causing the strength of the field to be decreased, and when it decreases the current flowing through the controlling-electromagnet will be decreased, thereby causing the strength of the field to be increased. The strength of the field thus being varied inversely to the speed of the armature, the output of the generator will be confined within such limits as are safe for the system. When cars are added to the train, the output of the generator will increase to supply the increase in the demands for current, because new parallel circuits are placed across the main circuit, and when cars are taken from the train the output of the generator will decrease in accordance with the decrease in demands for current, because parallel circuits are removed from across the main circuit. It may be assumed, where two cars are in the train, as illustrated in the drawing, that the generator delivers a current of one hundred amperes, a current of fifty amperes being distributed to each car. If a car be added to the train, the output of the generator will increase to one hundred and fifty amperes, and if the car be taken from the train the output of the generator will decrease to fifty amperes, thereby making the output of the generator suitable for the system. Inasmuch as the controlling-electromagnet is arranged in the local circuit, the current to which it is subjected will be independent of the current delivered by the generator through the train-line to the other local circuits, and in consequence the generator may vary the output thereof when the number of cars in the train is changed without thereby causing the regulator to interfere with the ability of the generator to vary the output thereof.

The system may be provided with any suitable means to protect the lamps from being subjected to the rise in voltage which is necessary to charge the storage battery. Such means have been omitted from the drawing to avoid confusion in setting forth the essential features of the invention.

The rheostatic devices or variable resistances for regulating the generator are arranged in circuit in parallel with each other, the same being collectively in series with the field of the generator. The change which tends to occur in the resistance in circuit with the field when the number of rheostatic devices in parallel is changed is counteracted by the tendency of the generator to vary the output thereof. The effect of all of the rheostatic devices is therefore substantially the same as the individual effect of each rheostatic device. When the number of rheostatic devices in parallel is increased, there will necessarily be a slight decrease in the resistance in circuit with the field of the generator, and consequently the generator will slightly increase the output thereof; but such increase will be beneficial.

It will be understood that many changes may be made in the system which has been set forth herein without in any way departing from the invention as defined by the claims appended hereto.

Having thus described my invention, what I claim as new, and desire to secure by Letters Patent, is—

1. In a train-lighting system, in combination, a generator, driven at a variable speed, a local circuit arranged upon a unit of the train, a rheostat arranged upon said unit of the train and operatively connected in circuit with said generator to regulate the same, an electromagnet arranged in said local circuit and controlling the operation of said rheostat, a local circuit arranged upon each of other units of the train, means connecting the several local circuits to said generator in parallel with each other, and a storage battery and translating devices arranged in each local circuit.

2. In a train-lighting system, in combination, a generator driven at a variable speed and having a shunt-field, a local circuit arranged upon a unit of the train, a variable resistance carried upon said unit of the train and arranged in circuit with said shunt-field, an electromagnet arranged in said local circuit and controlling said variable resistance, a local circuit arranged upon each of other units of the train, means connecting said local circuits to said generator in parallel with each other, and a storage battery and translating devices arranged in each local circuit.

3. In a train-lighting system, in combination, a generator driven at a variable speed, a local circuit arranged upon a unit of the train, an automatic rheostatic device arranged upon said unit of the train and operatively connected in circuit with said generator to regulate the same, an electromagnet arranged in said local circuit and controlling the operation of said rheostatic device, a local circuit arranged upon each of other units of the train, means connecting said local circuits to said generator in parallel with each other, and translating devices arranged in each of said local circuits.

4. In a train-lighting system, in combination, a generator driven at a variable speed, a local circuit arranged upon a unit of the train, a storage battery and translating devices arranged in said local circuit, a rheostatic device arranged upon said unit of the train and operatively connected in circuit with said generator to confine the output thereof within prearranged limits, an electromagnet arranged in said local circuit in series with both said storage battery and said translating devices and controlling the operation of said rheostatic device, a local circuit arranged upon each of other units of the train and having arranged therein a storage battery and translating devices, and means connecting the several local circuits to said generator in parallel with each other.

5. In a train-lighting system, in combination, a generator driven at a variable speed and arranged upon the tender of the locomotive, a local circuit arranged upon a car, an automatic rheostatic device arranged upon said car and operatively connected in circuit with said generator to confine the output thereof within prearranged limits, an electromagnet arranged in said local circuit and controlling the operation of said rheostatic device, a local circuit arranged upon each of other cars, means connecting said local circuits to said generator in parallel with each other, and a storage battery and translating devices arranged in each local circuit.

6. In combination, a generator driven at a variable speed and arranged upon the tender of the locomotive, said generator being provided with a shunt-field, a local circuit arranged upon a car, a variable resistance carried upon said car and arranged in circuit with said shunt-field, an electromagnet arranged in said local circuit and controlling said variable resistance, a local circuit located upon each of other cars, means connecting said local circuits to said generator in parallel with each other, and a storage battery and translating devices arranged in each local circuit.

7. In a train-lighting system, in combination, a generator driven at a variable speed, a local circuit arranged upon each of a plurality of units of the train, translating devices arranged in each local circuit, a main circuit connecting said local circuits to said generator in parallel with each other, an automatic rheostatic device arranged upon each of said units of the train and operatively connected in circuit with said generator to confine the output thereof within prearranged limits.

8. In a train-lighting system, in combination, a generator driven at a variable speed, a local circuit arranged upon each of a plurality of units of the train, translating devices arranged in each local circuit, a train-circuit connecting said local circuits to said generator in parallel with each other, an automatic rheostatic device carried upon each of said units of the train, any one of said automatic rheostatic devices being adapted to be operatively connected in circuit with said generator to confine the output thereof within prearranged limits.

9. In a train-lighting system, in combination, a generator driven at a variable speed, a local circuit arranged upon each of a plurality of units of the train, translating devices arranged in each local circuit, a train-circuit connecting said local circuits to said generator in parallel with each other, an automatic rheostatic device arranged upon each of said units of the train and operatively connected in circuit with said generator to confine the output thereof within prearranged limits, said automatic rheostatic device being arranged in circuit in parallel with each other.

10. In a train-lighting system, in combination, a generator driven at a variable speed and having a shunt-field, a local circuit arranged upon each of a plurality of units of the train, lamps arranged in each local circuit, a train-circuit connecting said local circuits to said generator in parallel with each other, a variable resistance carried upon each unit of the train and arranged in circuit with the said shunt-field, and an electromagnet arranged in each local circuit and controlling the variable resistance upon the unit of the train therewith.

11. In a train-lighting system, in combination, a generator driven at a variable speed and having a shunt-field, a local circuit arranged upon each of a plurality of units of the train, a storage battery and translating devices arranged in each local circuit, a train-circuit connecting said local circuits to said generator in parallel with each other, a variable resistance carried upon each of said units of the train and arranged in circuit with said shunt-field, an electromagnet arranged in each local circuit in series with the storage battery and translating devices therein and controlling the variable resistance upon the unit of the train therewith.

12. In a train-lighting system, in combination, a generator driven at a variable speed and having a shunt-field, a local circuit arranged upon each of a plurality of units of the train, a storage battery and translating devices arranged in each local circuit, a train-circuit connecting said local circuits to said generator, a variable resistance carried upon each of said units of the train, said variable resistances being arranged in circuit in parallel with each other, the same being collectively in series with the field of said generator, and an electromagnet arranged in each local circuit in series with both the storage battery and the translating devices therein and controlling the variable resistance upon the unit of the train therewith.

In witness whereof I have hereunto subscribed my name in the presence of two witnesses.

WILLIAM L. BLISS.

Witnesses:
EDWIN B. H. TOWER, Jr.,
J. W. ROBERTSON.